Dec. 13, 1927.

A. J. KOMENAK 1,652,676

TRUNK LOCK AND DRAWBOLT

Filed May 2, 1924

Inventor
Albert J. Komenak
Wooster & Davis
Attorneys

Patented Dec. 13, 1927.

1,652,676

UNITED STATES PATENT OFFICE.

ALBERT J. KOMENAK, OF STAMFORD, CONNECTICUT, ASSIGNOR TO THE EXCELSIOR HARDWARE COMPANY, OF STAMFORD, CONNECTICUT, A CORPORATION OF CONNECTICUT.

TRUNK LOCK AND DRAWBOLT.

Application filed May 2, 1924. Serial No. 710,567.

This invention relates to fasteners for trunks and the like, especially fasteners of the drawbolt type and has for an object to provide a device of this character with means comprising a part of the fastener for locking the lever in the securing position.

It is also an object of the invention to provide an improved construction for this type of devices which will be neat and attractive in appearance, which will comprise comparatively few parts and so will not be likely to be easily gotten out of order, and which will securely retain the trunk or the like closed.

With these and other objects in view, I have devised the construction illustrated in the accompanying drawing forming a part of this specification, the various elements being indicated by the same reference characters in the various figures. In this drawing, Fig. 1 is a front elevation of the fastener in securing position.

Figure 2:
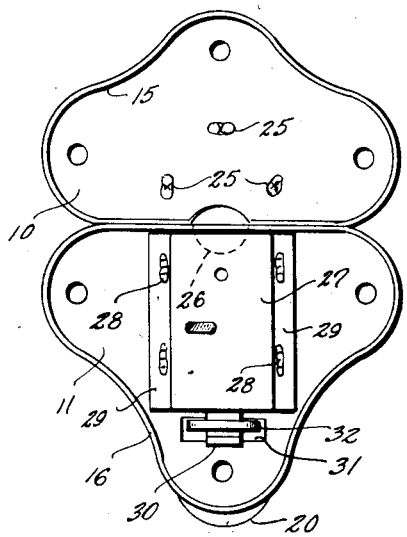
Fig. 2 is a rear elevation thereof.
Figure 3:
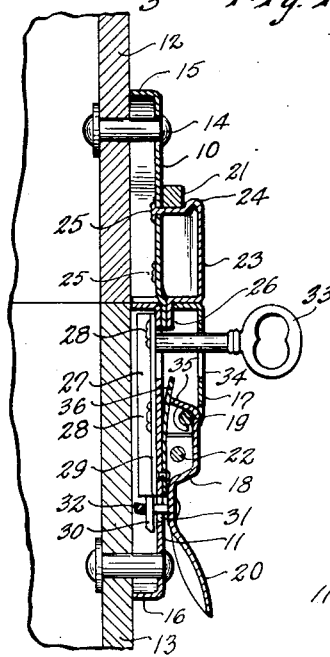
Fig. 3 is a longitudinal section showing the latch with the fastener in locked position

The fastener comprises a pair of separable members 10 and 11 adapted to be secured to the cover and body of a trunk or similar device, the cover being indicated at 12 and the body at 13, the members 10 and 11 being secured thereto by any suitable means, such as rivets 14. These separable members may be any desired shape but are preferably plates provided with flanges 15 and 16 about their peripheries to raise the body of the plates somewhat from the surfaces of the cover and body members. Secured to one of these members, as the member 11, is a casing 17, preferably stamped from sheet metal, and to which is pivoted a lever 18 by any suitable means as a transverse pin 19 extending through the sides of the casing. This lever is also preferably stamped from sheet metal and provided with a finger piece 20 for operation thereof. Pivoted to this lever at a point spaced from the pivot 19 is a drawbolt 21. This drawbolt is preferably substantially U-shaped as shown and is pivoted to the lever by means of a pin 22 extending through the side members of the bolt adjacent their free ends and through the sides of the lever. The upper member 10 is provided with a means to be engaged by this bolt, such as a hook member 23, having an upwardly extending flange 24 on its outer edge at the top thereof so that the upper end of the drawbar may rest behind this flange and be secured and held thereby. The hook member 23 is also preferably stamped from sheet metal, the sides of which are provided with lugs 25 extending through openings in the plate 10 and riveted over on the back side thereof as shown in Figs. 2 and 3. The plate 10 and the hook member 23 are provided with downwardly extending lugs or projections forming a dowel 26 adapted to extend through an opening in the top of the casing 17, as shown in Fig. 3 to properly position the separable members.

Figure 1:
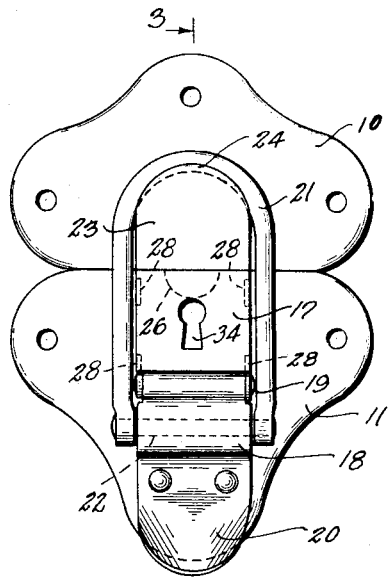
Figure 4:
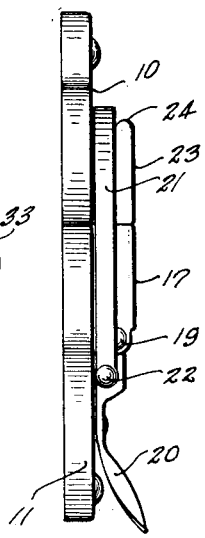
Fig. 4 is a side elevation thereof.

Mounted within the space enclosed by the flanges 16, or on the back of the plate 11, is a lock 27, the casing only being shown as the lock may be of any usual construction. It is shown as mounted in position by means of lugs 28 on the sides of the casing 17 projecting through the plate 11 and riveted over on the flanges 29 on the casing of the lock, as shown in Fig. 2. The lock may be any suitable type as desired but is preferably provided with a sliding bolt 30 which is adapted when extended to project across an opening 31 in the plate 11 and to pass through a loop 32 carried on the rear side of the lever 18 when the lever is pressed inwardly or in the holding position. Thus the bolt has a bearing on opposite sides of the opening 31, making a very rigid and strong construction. The lock may be operated by the usual key 33 passing through a suitable key hole 34 in the front wall of the casing 17. The lever 18 is also preferably provided with a tongue 35 so arranged as to pass through the horizontal plane of the pivot 19 for the lever and to coact with a spring 36 which acts to hold the lever in either the raised position shown in Fig. 5 or in the depressed or securing position, as shown in Figs. 1, 3 and 4.

Figure 5:
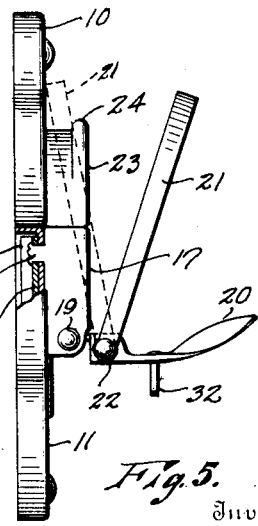
Fig. 5 is a side elevation showing the fastener unlocked.

It is believed the operation will be obvious. If the cover of the trunk or other similar device is closed the drawbolt 21 may be placed behind the flange 24 on the hook member, as indicated in dotted lines in Fig. 5, and then by depressing the lever to the position shown in Figs. 1, 3 and 4 the cover is drawn tightly closed and held in this position. By merely turning the key the lever is locked in this position, and the trunk is securely locked. As the locking means forms a part of the catch there is no chance of its becoming lost, and it gives a much neater and more attractive appearance. There is also no danger of its being knocked off in handling of the baggage as where a separate locking means is employed. By manipulation of the key the bolt 30 may be withdrawn into its casing and the cover released by merely lifting the free end of the lever 18, as shown in Fig. 5.

Having thus set forth the nature of my invention, what I claim is:

A trunk fastener comprising separable members, one of said members comprising a sheet metal body member having a rearwardly extending peripheral flange to form a chamber with the surface of the trunk, a housing extending forwardly from said member, a finger lever pivoted to the housing, a substantially U-shaped drawbolt with its side members pivoted to the lever on an axis spaced from its pivot, means carried by the other member to be engaged by the other end of said drawbolt, a loop carried by the lever outwardly of its pivot and adapted to project through an opening in the body member into said chamber, and a lock mechanism mounted on the body member in said chamber, said lock mechanism including a key operated bolt slidable longitudinally of the drawbolt and arranged to be moved into said loop when it is in said opening to lock the lever against the body member.

In testimony whereof I affix my signature.

ALBERT J. KOMENAK.